US012643163B2

(12) United States Patent
Kroedel et al.

(10) Patent No.: US 12,643,163 B2
(45) Date of Patent: Jun. 2, 2026

(54) COOLANT TURBINE FOR ROTARY CUTTING TOOL; ROTARY CUTTING TOOL; COOLANT TURBINE MODULE; AND METHOD FOR OPERATING A ROTARY CUTTING TOOL

(71) Applicant: Kennametal Inc., Latrobe, PA (US)

(72) Inventors: Alexander Kroedel, Fuerth (DE); Santosh Boregowda, Bangalore (IN); Iranna Shidrameshetra, Bangalore (IN); Ravi Halasur, Bangalore (IN); Nicholas Henry, Latrobe, PA (US)

(73) Assignee: KENNAMETAL INC., Latrobe, PA (US)

( * ) Notice: Subject to any disclaimer, the term of this patent is extended or adjusted under 35 U.S.C. 154(b) by 871 days.

(21) Appl. No.: 17/939,257

(22) Filed: Sep. 7, 2022

(65) Prior Publication Data

US 2024/0075543 A1 Mar. 7, 2024

(51) Int. Cl.
  *B23C 5/28* (2006.01)
  *B23C 5/00* (2006.01)
  *B23C 5/08* (2006.01)
  *B23Q 11/10* (2006.01)

(52) U.S. Cl.
  CPC .............. *B23C 5/28* (2013.01); *B23C 5/006* (2013.01); *B23C 5/08* (2013.01); *B23B 2231/24* (2013.01); *B23Q 11/10* (2013.01)

(58) Field of Classification Search
  CPC ..... B23Q 11/10; B23B 31/02; B23B 2231/24; B23B 51/06; B23B 51/00; B23C 5/28; B23C 5/006; B23C 5/08; B23C 9/00

USPC .......................................................... 279/20
See application file for complete search history.

(56) References Cited

U.S. PATENT DOCUMENTS

| | | | | |
|---|---|---|---|---|
| 594,330 | A | * | 11/1897 | Cox, Jr. ............... B23Q 1/0036 |
| | | | | 285/190 |
| 2,690,149 | A | * | 9/1954 | Adams ................... D05B 71/04 |
| | | | | 112/281 |
| 3,874,808 | A | * | 4/1975 | Zaccardelli ............. B23B 47/34 |
| | | | | 408/1 R |
| 4,213,354 | A | | 7/1980 | Dahinden |

(Continued)

FOREIGN PATENT DOCUMENTS

| | | | | |
|---|---|---|---|---|
| DE | | 3739115 | A | * 11/1987 |
| DE | | 3819799 | A | * 10/1988 |

(Continued)

OTHER PUBLICATIONS

Nov. 29, 2025 Foreign Office Action German Application No. DE102023123144, 06 Pages.

*Primary Examiner* — Sara Addisu
(74) *Attorney, Agent, or Firm* — Christopher J. Owens

(57) ABSTRACT

The invention relates to a coolant turbine for a rotary cutting tool, a rotary cutting tool, a coolant turbine module, and a method for operating a rotary cutting tool. The coolant turbine comprises an annular turbine base body having a first front face, an opposite second front face, and a plurality of coolant passages, which are arranged so as to be distributed around a central axis of the turbine base body, said passages having a coolant inlet and a coolant outlet, each of which extends through the turbine base body at least in portions in such a way that the turbine base body can be set into rotation by a flow of coolant.

7 Claims, 7 Drawing Sheets

(56) References Cited

U.S. PATENT DOCUMENTS

| | | | | |
|---|---|---|---|---|
| 4,669,933 A | * | 6/1987 | Dye | ..................... B23Q 1/0036 |
| | | | | 408/239 R |
| 5,358,360 A | | 10/1994 | Mai | |
| 5,947,657 A | * | 9/1999 | Lipohar | .................. B23B 49/02 |
| | | | | 408/97 |
| 9,616,541 B2 | * | 4/2017 | Haimer | .............. B23B 31/1179 |
| 2008/0277886 A1 | * | 11/2008 | Peter | .................... B23B 31/001 |
| | | | | 279/60 |
| 2010/0270757 A1 | * | 10/2010 | Beckington | ......... B23B 31/1179 |
| | | | | 279/20 |
| 2013/0069322 A1 | * | 3/2013 | Nakai | ............... B23Q 11/1023 |
| | | | | 279/20 |
| 2014/0232072 A1 | * | 8/2014 | Ayguen | ................. B23B 31/008 |
| | | | | 279/4.06 |
| 2015/0042050 A1 | | 2/2015 | Haimer et al. | |
| 2015/0367423 A1 | | 12/2015 | Voss | |
| 2016/0332236 A1 | | 11/2016 | Stoyanov | |
| 2017/0197251 A1 | | 7/2017 | Nakatani et al. | |
| 2018/0347701 A1 | | 12/2018 | Bookheimer et al. | |
| 2018/0361485 A1 | | 12/2018 | Matsuda et al. | |
| 2018/0369976 A1 | | 12/2018 | Gosselin et al. | |
| 2019/0084047 A1 | | 3/2019 | Lehto et al. | |
| 2020/0222990 A1 | | 7/2020 | Marchione et al. | |
| 2024/0307981 A1 | * | 9/2024 | Kroedel | ................. B23B 31/30 |
| 2025/0178102 A1 | * | 6/2025 | Frota De Souza Filho | ................. |
| | | | | B23C 5/16 |

FOREIGN PATENT DOCUMENTS

| | | | | | |
|---|---|---|---|---|---|
| DE | 4218879 A1 | * | 12/1993 | ......... | B23Q 11/1084 |
| DE | 102014211410 B3 | * | 11/2015 | .............. | B23C 5/28 |
| DE | 102016121656 B3 | | 2/2018 | | |
| EP | 1844886 A1 | | 10/2007 | | |
| EP | 2819799 A1 | | 1/2015 | | |
| JP | 859129602 A | | 7/1984 | | |
| JP | 2006218549 A | * | 8/2006 | .............. | B23C 5/08 |
| JP | 2010142889 A | | 7/2010 | | |
| JP | 2019123041 A | | 7/2019 | | |
| WO | 2010062850 A1 | | 6/2010 | | |
| WO | 2011138360 A1 | | 11/2011 | | |
| WO | 2012084688 A1 | | 6/2012 | | |
| WO | 2015107101 A1 | | 7/2015 | | |
| WO | 2017009328 A1 | | 1/2017 | | |
| WO | 2021048267 A1 | | 3/2021 | | |

* cited by examiner

Fig. 3
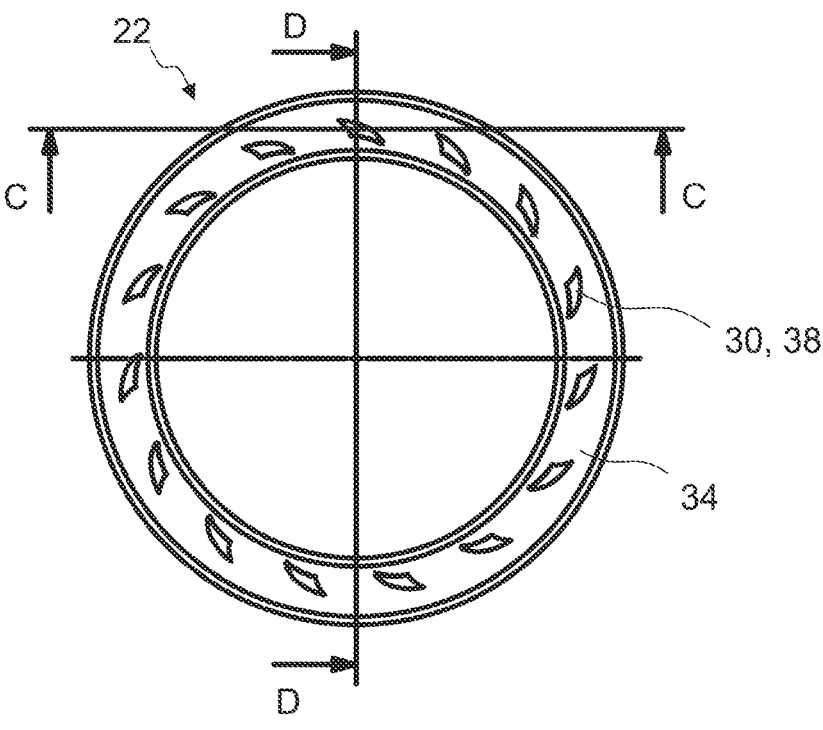
Fig. 4
Fig. 5
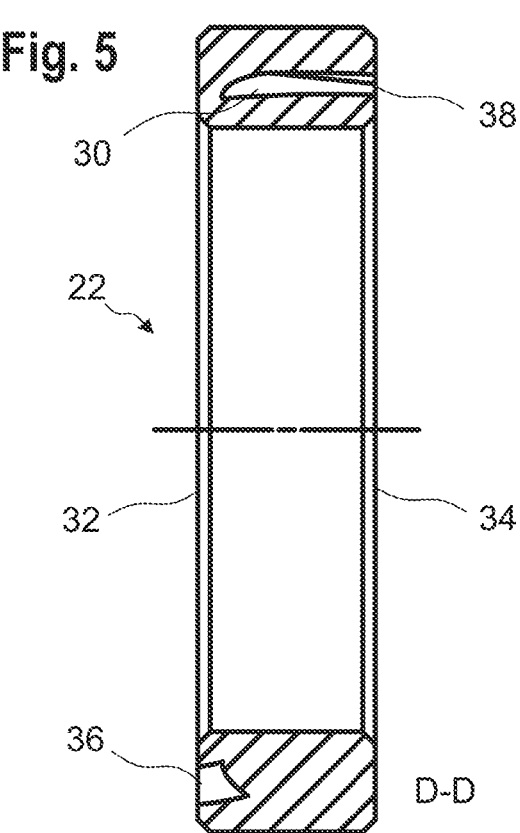

E-E

1

COOLANT TURBINE FOR ROTARY CUTTING TOOL; ROTARY CUTTING TOOL; COOLANT TURBINE MODULE; AND METHOD FOR OPERATING A ROTARY CUTTING TOOL

FIELD

The invention relates to a coolant turbine for a rotary cutting tool, a rotary cutting tool, a coolant turbine module, and a method for operating a rotary cutting tool.

BACKGROUND

When rotary cutting tools, such as drills or mills, are used in order to machine material, heat typically builds up at the cutting interface, resulting in a heating of the cutting element and the workpiece. This can adversely impact the efficiency and accuracy of the machining operation and tool life.

A typical manner of dissipating the heat is by using coolant, which is supplied as close as possible to the cutting interface. The coolant is used not only for cooling but also for reducing friction (lubrication) at the cutting interface.

For example, the coolant supply can occur via an external nozzle arranged adjacently to the cutting element. Such a system is inexpensive and easy to assemble. However, it is susceptible to damage and is unable to deliver the coolant exactly to the desired location, namely around the cutting element.

In order to avoid these drawbacks, rotary cutting tools have been developed that can deliver coolant via delivery holes in the tool holder of the rotary cutting tool, particularly in the chuck. This arrangement allows for particularly homogeneous and robust cooling.

However, this arrangement of the coolant supply has the disadvantage that the coolant is subjected to a centrifugal force by the rotation of the rotary cutting tool and is thereby accelerated outwardly, i.e., away from the cutting element, after the exit.

The centrifugal force F acting on the coolant results from the known formula $F=m*w^2*r$, wherein m is the mass of the coolant, w is the angular velocity, and r is the distance from the axis of rotation. Because the centrifugal force is squarely dependent on the angular velocity and thus the current rotation speed of the rotary cutting tool, a correction of the trajectory of the exiting coolant cannot be accomplished by static means, for example, a particular coolant channel design or static nozzle orientations.

As a result, the amount of coolant that reaches the cutting zone can vary as a function of the rotation speed, resulting in a reduced cooling efficiency.

It is therefore the problem of the invention to reduce the centrifugal forces acting on the coolant and thus to achieve a more uniform cooling effect over the rotation speed of the rotary cutting tool.

SUMMARY

According to the present invention, the problem is solved by a coolant turbine for a rotary cutting tool. The coolant turbine comprises an annular turbine base body having a first front face, an opposite second front face, and a plurality of coolant passages, which are arranged so as to be distributed around a central axis of the turbine base body, said passages having a coolant inlet and a coolant outlet, each of which extends through the turbine base body at least in portions in such a way that the turbine base body can be set into rotation by a flow of coolant.

The term "annular" here refers not only to flat-like geometries but also to hollow cylinders, in particular with a height that can lie in the range of the ring diameter.

The basic idea of the invention is to provide a coolant turbine through which the coolant can flow and which can rotate opposite to the rotation direction of the rotary cutting tool. This reduces the relative ambient rotation speed that acts on the coolant immediately prior to its exit. As a result, centrifugal forces acting on the coolant also decrease. Thus, the coolant is no longer, or at least less strongly, driven circumferentially away from the cutting element on its way to the cutting interface. This improves the efficiency and uniformity of the cooling over the rotation speed range.

In a technically simple embodiment of the coolant turbine, the coolant passages extend from the first front face of the turbine base body to the opposite second front face of the turbine base body. The coolant passages each have a coolant inlet at the first front face and a coolant outlet at the second front face.

It can be provided here that the coolant outlets are respectively arranged so as to be offset from the coolant inlets in the circumferential direction of the turbine base body. In other words, the coolant passages between the front faces do not run parallel to the center axis of the turbine base body, but rather run obliquely in the circumferential direction. This causes the coolant turbine to be set into rotation by inflowing coolant. Thus, it is not necessary to provide a complicated drive mechanism having further drive components for driving the coolant turbine.

Alternatively, the coolant inlets and/or coolant outlets can also be circumferentially arranged. The coolant passages can thus begin and/or terminate laterally on the turbine base body, for example in the case of a Francis turbine.

Alternatively or additionally, the turbine base body can also comprise a coolant inlet-side inflow region comprising a plurality of inflow surfaces. These are each arranged at a predetermined angle to the first front face. Because coolant flows against the inflow surfaces and is redirected, a force is transferred that sets the turbine base body into rotation and/or accelerates a rotational movement.

In doing so, each inflow surface can be associated with one of the coolant passages. Such a construction is simple to manufacture and allows for an efficient use of the flow energy of the coolant.

One aspect of the invention provides that the coolant turbine comprises at least one fixing ring, wherein the fixing ring comprises a fastening means for fastening the coolant turbine to a rotary cutting tool, in particular to a chuck. The fixing ring serves to attach the turbine base body to the rotary cutting tool in a rotatably mounted manner. The fastening means, which can be configured, for example, as a locking element or bore for receiving screws, allows for a simple assembly of the fixing ring on the rotary cutting tool. In particular, it is conceivable that the fastening means can be releasable, so that the turbine base body can be exchanged. It is thus possible to select and use a turbine base body that is suitable for the application, in particular for the intended rotation speed.

Of course, the aforementioned examples of fastening means are to be understood as non-limiting. Other releasable as well as non-releasable joints, such as press fits, weld joints, solder joints, threaded and bayonet mounts, are conceivable.

It is further conceivable that the coolant turbine comprises a bearing, which is arranged between the turbine base body and the fixing ring and/or on the inner circumference of the turbine base body and/or on the outer circumference of the turbine base body. With the bearing, the turbine base body can rotate relative to its surroundings. In particular, the bearing reduces frictional losses in the intended use of the coolant turbine, resulting in reduced component wear.

The bearing can be, for example, a sliding bearing with sliding surfaces, a rolling bearing, or a needle bearing. Sliding and needle bearings are preferred in this case due to the low construction space requirement.

In particular, the bearing can comprise bearing rings, wherein at least one bearing ring is non-destructively releasably attached to the turbine base body and/or to a chuck of a rotary cutting tool. Due to the releasable attachment, the turbine base body and/or the bearing are easily exchangeable, for example in the event of wear.

Surfaces and/or walls of a turbine housing in which the coolant turbine can be arranged, as well as surfaces or walls of brackets for the coolant turbine, can also perform the function of the bearing rings. For example, between the turbine base body and the corresponding surface or wall, a rolling body is arranged.

In a preferred design variant, the bearing is a sliding bearing having a sliding surface formed on the second front face of the turbine base body and a sliding surface formed on the fixing ring. The sliding surfaces abut one another when the central axes of the fixing ring and the turbine base body are congruent. In this embodiment, the bearing is thus formed by the turbine base body and the fixing ring itself. The use of further bearing components is not necessary. The construction is therefore particularly simple and inexpensive to implement.

It can be provided that the sliding surfaces of the sliding bearing comprise an abrasion-resistant coating. This reduces the component wear and increases the service life of the individual components of the coolant turbine.

In order to enable an undisturbed coolant exit from the coolant outlets of the coolant turbine, it can be provided that the fixing ring has an inner diameter that is large enough so that the coolant outlets of the coolant passages lie completely within the inner diameter. In particular, the turbine base body can be supported exclusively in the outer circumferential region of its second front face on an inner circumferential region of the fixing ring. In this way, the outer circumferential region of the fixing ring can be utilized for attachment to the rotary cutting tool.

Of course, this is to be understood as non-limiting. Alternatively or additionally, a fixing ring can also be used, the outer diameter of which is small enough so that the coolant outlets of the coolant passages lie completely outside the outer diameter. In this case, the fixing ring can be fastened to the rotary cutting tool via its inner circumferential region.

The use of two or more fixing rings is also conceivable in order to improve the bearing, the force distribution, and/or the concentricity of the coolant turbine.

A further aspect of the invention provides that the coolant passages of the turbine base body run obliquely or in a curved manner in a circumferential direction in at least part of a portion, respectively. This increases the force or pulse transfer of inflowing coolant to the turbine base body, resulting in a higher rotation speed of the coolant turbine. The transferred force can be substantially proportional to the redirection of the flow of coolant. The stronger the curvature of the coolant passages, the stronger the coolant is redirected and the higher the torque transferred to the turbine base body.

It can also be provided that the coolant passages run towards the central axis of the turbine base body in the region of the coolant inlets. This also leads to an improved transfer of force and thus to an improved rotational behavior of the turbine base body.

In general, the coolant turbine can also be characterized in that the coolant outlets run at least approximately parallel to the center axis of the turbine base body and/or rectilinearly. Thus, a particularly high proportion of the exiting coolant arrives directly at the cutting zone, thereby improving cooling efficiency.

According to the present invention, the problem is also solved by a rotary cutting tool comprising a chuck having a tool receptacle opening, at least one coolant supply passage, and an axially open groove that is arranged on the front face so as to run annularly around the tool receptacle opening. A turbine base body of a coolant turbine according to the invention is arranged in the groove so as to be freely rotatable.

In particular, the groove can be deep enough so as to completely receive the turbine base body. This allows for a particularly space-saving component arrangement.

In general, the turbine base body can be arranged in the groove such that the coolant passages of the turbine base body run at least partially obliquely counter to the cutting rotation direction of the rotary cutting tool. If inflowing coolant hits these inclines, a transfer of force occurs, whereby the turbine base body is set into rotation opposite to the cutting direction.

It can also be provided that the groove has a bottom at which at least one coolant supply passage terminates.

In particular, it is conceivable that a coolant distribution passage is formed between the bottom of the groove and the turbine base body, said passage being annular in at least some portions. This can be achieved, for example, in that the groove is deeper than the height of the turbine base body. The coolant distribution passage achieves a particularly even distribution of the coolant discharge in the circumferential direction. The homogeneity of the cooling is thus improved.

A further aspect of the invention provides that the rotary cutting tool comprises a coolant supply unit comprising a plurality of coolant supply passages each running obliquely in the circumferential direction, in particular counter to the cutting rotation direction of the rotary cutting tool. The coolant supply unit can be arranged in particular at the bottom of the groove and/or between the bottom of the groove and the turbine base body.

With the coolant supply unit, the flow of coolant can be introduced obliquely into the turbine base body. The redirection of the coolant that is required for transferring force (i.e., in order to generate rotation) then occurs in the turbine base body. In particular, the inclined coolant inlet and the coolant redirection in the turbine base body can be coordinated with one another such that the coolant exit from the coolant turbine occurs at least approximately axially. This ensures that the coolant meets the cutting interface and its cooling or lubricating action can unfold.

In addition, the sloping arrangement of the coolant supply passages results in improved coolant entry into the coolant inlets of the turbine base body. Fluid flow turbulence can be avoided or at least reduced, resulting in higher efficiency and/or higher achievable rotation speeds of the coolant turbine.

It is conceivable that the coolant supply unit is a separate component. This enables a comparatively simple production thereof.

Alternatively, the coolant supply unit can also be directly integrated into, or integrally connected to, the chuck of the rotary cutting tool. This can, for example, save seals and reduce the failure susceptibility of the coolant turbine.

In one embodiment, the coolant supply passages of the coolant supply unit open into the groove obliquely in the direction of the central axis. This improves the flow of the coolant into the, for example, likewise oblique coolant inlets of the turbine base body. This minimizes flow losses. A higher power can be coupled into the turbine, thereby achieving higher turbine speeds.

Further, a fixing ring can be provided that is arranged on the chuck, partially closes the groove, and holds the turbine base body in the groove. This allows for a technically simple and reliable fixing of the coolant turbine to the chuck.

Preferably, the turbine base body is attached to the chuck by means of a non-destructively releasable fastening, for example by means of a screw or latch connection. As a result, the turbine base body can be exchanged as needed. In particular, it is conceivable that different turbine base bodies can be selected and inserted into the groove depending on the application and the planned rotation speed range.

It is also conceivable that the rotary cutting tool can comprise one or more seals arranged between the turbine base body and the chuck and/or the turbine base body and a component fixedly connected to the chuck. The seals prevent a leakage of coolant at undesirable locations. This ensures that all supplied coolant exits through the coolant outlets of the coolant turbine and can be utilized for cooling purposes.

Further, the problem is solved by a coolant turbine module that is fixable to a rotary cutting tool. The coolant turbine module comprises a hollow, cylindrical housing in which a coolant turbine according to the invention is arranged. On a first front face, the housing has a coolant inlet opening, on a second front face it has a coolant outlet opening, and between the two front faces, it has a centrally continuous cutting element opening.

The coolant turbine module serves to secure the coolant turbine to the rotary cutting tool in a simple manner, in particular without having to make major chuck changes. Thus, chucks already known from the prior art, which have a front-face coolant outlet, can also be retrofitted with a coolant turbine according to the invention.

Of course, the advantages discussed with respect to the coolant turbine and rotary cutting tool also apply to the coolant turbine module.

One aspect of the invention provides that the coolant turbine module comprises a fastening element for fastening to a rotary cutting tool, in particular to a chuck. In this case, fastening elements that can be repeatedly fastened and released are preferred, because they allow for a simple exchange of the coolant turbine. For example, screw, latch, or bayonet fastening elements can be utilized for this purpose.

Preferably, the fastening element can be arranged on or close to the first front face of the housing. This allows for a technically simple fastening to a front face of the chuck.

The problem is also solved by a method for operating a rotary cutting tool having a coolant turbine according to the invention, wherein, upon rotation of the rotary cutting tool, the turbine base body rotates in the opposite direction and ejects coolant. Of course, the advantages discussed with respect to the coolant turbine, the rotary cutting tool, and the coolant turbine module also apply to the method.

In a preferred embodiment of the method, the coolant pressure and/or the coolant flow rate of the coolant introduced into the rotary cutting tool is controlled as a function of the rotation speed of the rotary cutting tool, wherein a lower coolant pressure or coolant flow rate is set at a lower speed. The force transferred to the turbine base body, and thus the rotation speed of the coolant turbine, can also be predetermined via the set coolant pressure and the coolant flow rate, respectively. Generally, at lower rotation speeds of the rotary cutting tool, the centrifugal forces acting on the coolant are lower. Therefore, a lower rotation speed of the coolant turbine and thus a lower coolant pressure or coolant flow rate is also sufficient.

In particular, it is conceivable that the coolant pressure or the coolant flow rate is controlled in the method in such a way that, when rotary cutting, the absolute rotation speed of the turbine base body compared to a static or fixed reference point, for example a workpiece holder, is less than 50%, in particular less than 25%, of the momentary rotation speed of the rotary cutting tool. Thus, it is not necessary to reduce to zero the effective speed to which the coolant is subjected compared to the stationary environment. Depending on the application, it can already be sufficient to reduce the effective rotation speed by the counter-rotation of the coolant turbine to such an extent that a majority of the exiting coolant enters the cutting region. Lower rotation speeds of the coolant turbine can have a positive effect on the service life of the coolant turbine.

BRIEF DESCRIPTION OF THE DRAWINGS

FIG. 3 shows a plan view of a turbine base body of a coolant turbine according to the invention in a first embodiment;

FIG. 4 shows a view of a cut through the turbine base body along the cut plane C-C of FIG. 3;

FIG. 5 shows a view of a cut through the turbine base body along the cut plane D-D of FIG. 3;

DETAILED DESCRIPTION

Figure 1:
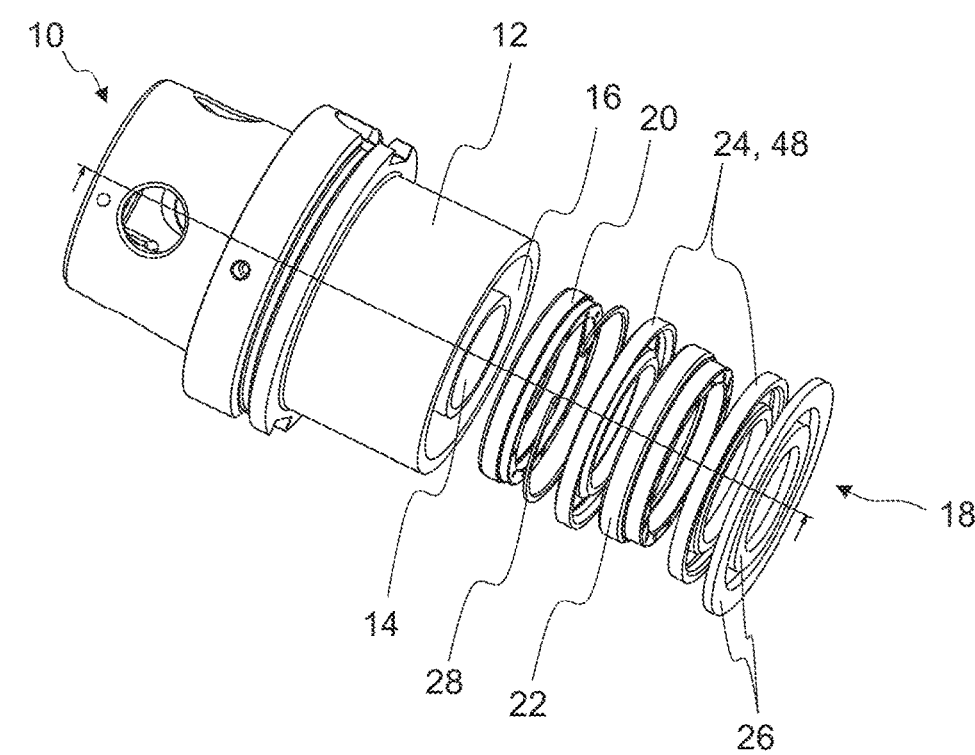
FIG. 1 shows an exploded view of a rotary cutting tool according to the invention.
Figure 2:
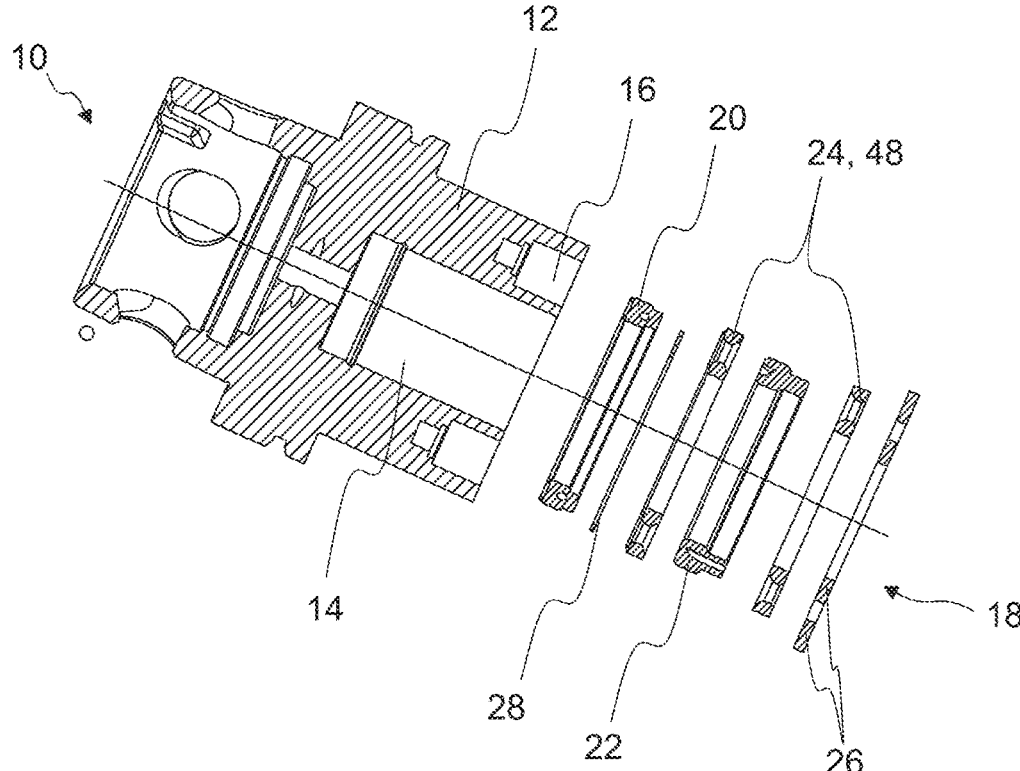
FIG. 2 shows a cross-sectional view of the exploded view of FIG. 1.
Figure 6:
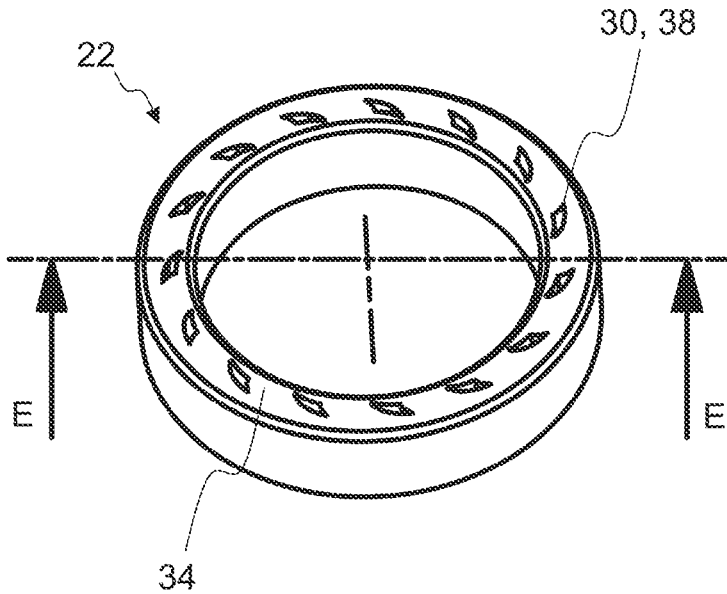
FIG. 6 shows a three-dimensional view of the turbine base body from FIGS. 3 to 5.
Figure 7:
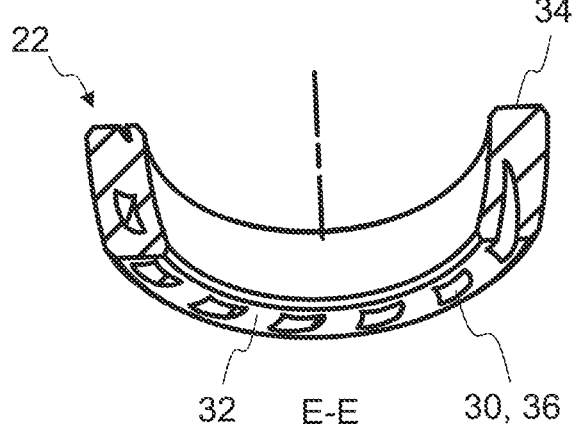
FIG. 7 shows a three-dimensional view of a cut through the turbine base body along the cut plane E-E of FIG. 6.

FIGS. 1 and 2 show an exemplary embodiment of a rotary cutting tool 10 according to the invention.

The rotary cutting tool 10 comprises a chuck 12 having a tool receptacle opening 14, which is provided for clamping a cutting element, for example a drill, a cutting head, and/or a solid carbide mill.

The chuck 12 can be a conventional mechanical chuck, a heat-shrink chuck, or a hydraulic chuck. Of course, this is to be understood as non-limiting. Additional chuck types are conceivable.

A front-face open annular groove 16 extends around the tool receptacle opening 14, in which a coolant turbine 18 is arranged.

In the exemplary embodiment shown, the coolant turbine 18 comprises as separate components a coolant supply unit 20, a turbine base body 22 in a first embodiment, two bearings 24, and two coaxial fixing rings 26. The turbine base body 22 is arranged so as to be freely rotatable in the groove 16 between the two bearings 24.

In addition, in the figures shown, a retaining ring 28 is seated in the groove 16 between the coolant supply unit 20 and one of the bearings 24. This ring is configured as a clamping ring and serves to secure the coolant supply unit 20 against falling out during assembly. Of course, embodiments without the retaining ring 28, or in which one or more further retaining rings 28 are arranged at various further positions, are also conceivable.

The turbine base body 22 of the coolant turbine 18 is shown in further detail in FIGS. 3 to 7.

The turbine base body 22 can be a 3D pressure piece made of steel or plastic, for example. Alternatively, the turbine base body 22 can also be manufactured from a solid piece, into which bores are introduced.

Generally, the turbine base body 22 is annular in shape and has a plurality of coolant passages 30 distributed around its central axis. In the present case, the coolant passages 30 each extend from a first front face 32 of the turbine base body 22 to an opposite second front face 34 of the turbine base body 22.

Of course, this configuration of the turbine base body 22 is to be understood as non-limiting. In particular, turbine base bodies 22 are also conceivable in which coolant inlets 36 and/or coolant outlets 38 can be circumferentially arranged, for example Francis turbine bodies.

In the exemplary embodiment shown, the coolant passages 30 each comprise a coolant inlet 36 at the first front face 32 and a coolant outlet 38 at the second front face 34.

The coolant outlets 38 are arranged circumferentially offset from associated coolant inlets 36 of the turbine base body 22. This offset arrangement causes the coolant turbine 18 to be set into rotation by inflowing coolant, wherein the rotation direction is opposite to the cutting rotation direction of the rotary cutting tool 10.

Due to the rotation of the turbine base body 22, the relative velocity, i.e., the velocity relative to the environment to which the coolant is subjected by rotation of the rotary cutting tool 10, is reduced. As a result, centrifugal forces acting on the coolant also decrease. Thus, the coolant is no longer, or at least less strongly, accelerated away from the cutting element after it is discharged from the coolant passages 30, resulting in improved efficiency and uniformity of cooling.

The offset arrangement of the coolant outlets 38 with respect to the coolant inlets 36 is achieved in the exemplary embodiment in that the coolant passages 30 each run in a circumferentially curved manner. The coolant passages 30 therefore do not have any steps or edges that could affect the flow and/or cause turbulence.

As can be seen in FIGS. 3 to 7, the coolant passages 30 also extend in the region of the coolant inlets 36 towards the central axis of the turbine base body 22. The coolant outlets 38, on the other hand, are approximately rectilinear in form and are arranged parallel to the central axis of the turbine base body 22. This leads to an improved focus of the exiting coolant jet as well as a better power transfer from the cooling liquid to the turbine base body 22.

Figure 8:
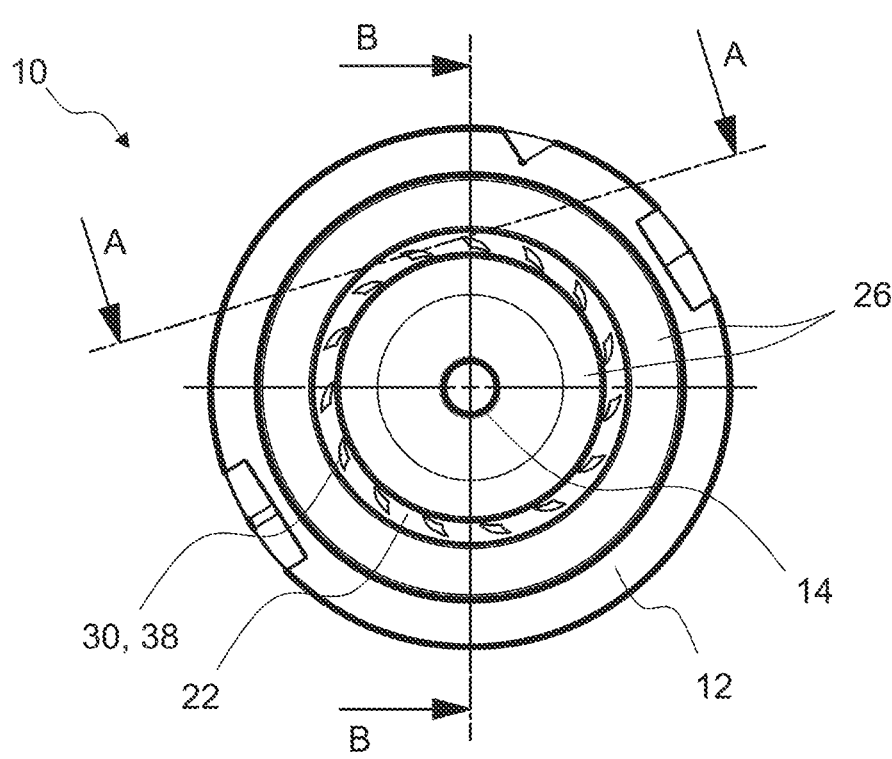
FIG. 8 shows a top plan view of the assembled rotary cutting tool of FIGS. 1 and 2.
Figure 9:
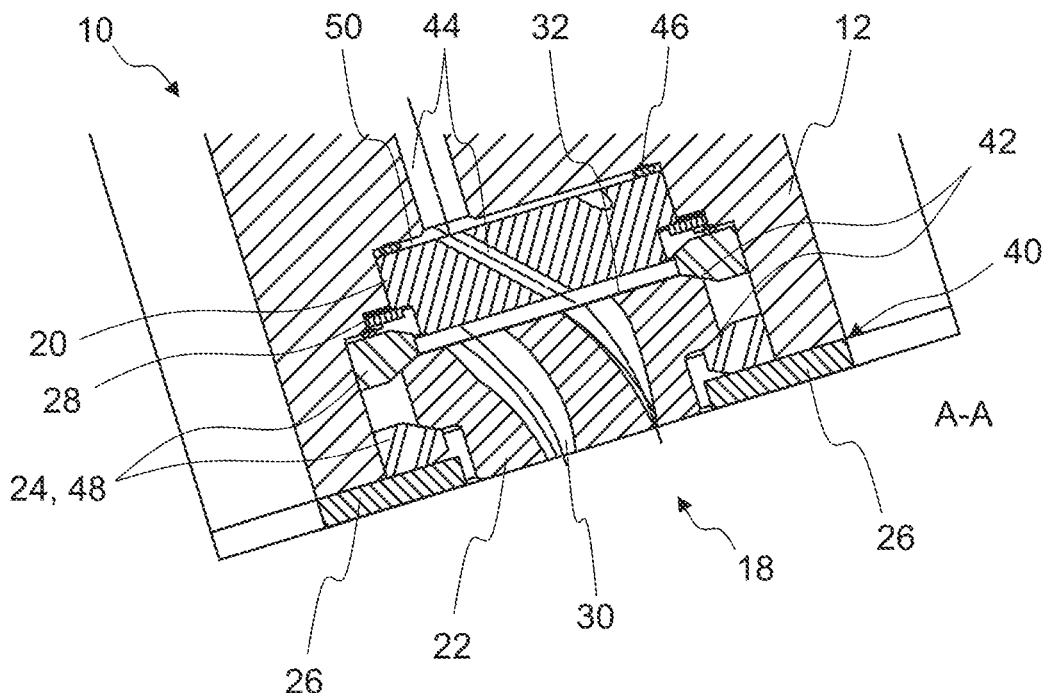
FIG. 9 shows a view of a cut through the rotary cutting tool along the cut plane A-A of FIG. 8.
Figure 10:
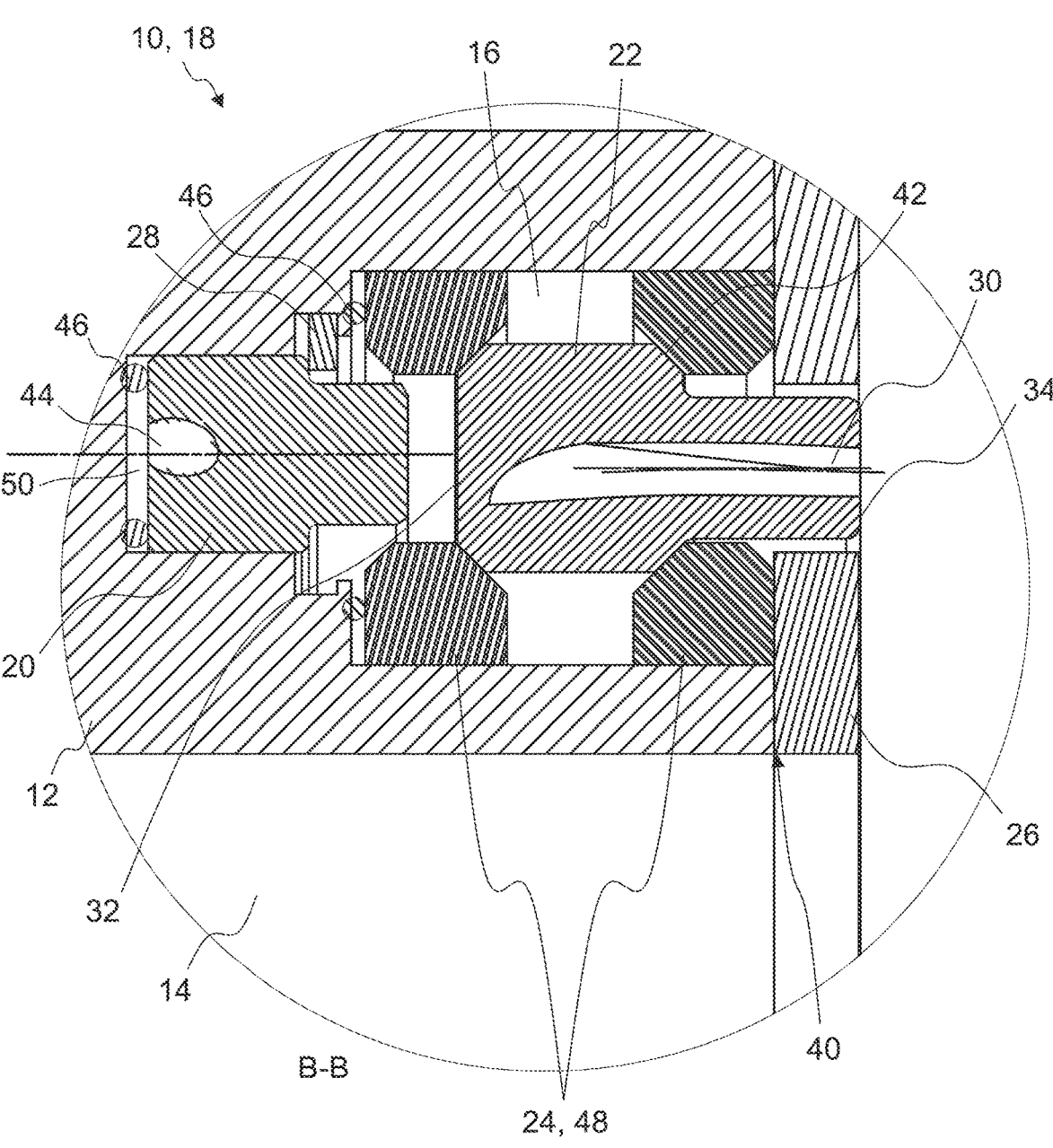
FIG. 10 shows a partial regional view of a cut through the rotary cutting tool along the cut plane B-B of FIG. 8.

The arrangement of the turbine base body 22 in the groove 16 of the chuck 12 is shown in detail in FIGS. 8 to 10.

FIG. 8 shows a front-face top plan view of the rotary cutting tool 10. In this view, the turbine base body 22 is obstructed on both its inner and outer circumference by the fixing rings 26, which partially close the groove 16. Only the region immediately around the coolant outlets 38 is visible.

In the described arrangement, the outer fixing ring 26 has an inner diameter that is large enough so that the coolant outlets 38 lie completely within the inner diameter. The inner fixing ring 26, on the other hand, has an outer diameter that is small enough so that the coolant outlets 38 lie completely outside the outer diameter. Both fixing rings 26 thus form an annular gap in which the coolant outlets 38 lie and through which the coolant can be ejected.

In addition, further embodiments are conceivable in which only a fixing ring 26 is present, for example only the inner or only the outer fixing ring 26.

In the exemplary embodiment, the fixing rings 26 secure the turbine base body 22 as well as the bearings 24 against falling out of the groove 16. To this end, the fixing rings 26 are attached to the chuck 12 on the front face by means of a fastening means 40, as shown in FIG. 9. For example, the fastening means 40 can be an adhesive. Alternatively, the fixing ring(s) 26 can be fixed to the chuck 12 by means of welding, soldering, or riveting joints. However, bolted or latched joints are preferred, because they are releasable and thus allow for a simple exchange of the turbine base body 22.

As shown in FIGS. 9 and 10, the turbine base body 22 does not abut the fixing rings 26 directly in the exemplary embodiment. Bearings 24 are arranged between the fixing rings 26 and the turbine base body 22, as well as between the coolant supply unit 20 and the turbine base body 22.

In the preferred embodiment shown, the bearings 24 are each space-saving slide bearings having sliding surfaces 42. However, other types of bearings can alternatively be employed, for example needle or ball bearings.

In the exemplary embodiment, the bearings 24 are formed as bearing rings 48, which can be non-destructively released from the other surrounding components, in particular by removing the fixing rings 26. This allows for a simple exchange, for example in the event of wear.

Alternatively or additionally, further bearings 24 can be provided, in particular those arranged between the turbine base body 22 and the fixing ring 26 and/or on the inner circumference of the turbine base body 22 and/or on the outer circumference of the turbine base body 22.

In addition to the use of bearings 24 with bearing rings 48, design variants are conceivable in which a fixing ring 26 has a sliding surface 42, where the turbine base body 22 can directly slide off in a rotary fashion. In particular, a sliding surface 42 can be provided on the second front face 34 of the turbine base body 22 abutting the sliding surface 42 of the fixing ring 26, when the central axes of the fixing ring 26 and the turbine base body 22 are congruent.

To reduce wear on the bearings 24, the sliding surfaces 42 in the exemplary embodiment have abrasion-resistant coatings with a low coefficient of friction, for example diamond or ceramic coatings.

In FIGS. 9 and 10, in addition to the turbine base body 22 and the bearings 24, the coolant supply of the coolant turbine 18 is also shown.

This consists of at least one coolant supply passage 44, which runs through the chuck 12 and opens into the bottom of the groove 16.

Between the bottom of the groove 16 and the turbine base body 22, in the exemplary embodiment, the annular coolant supply unit 20 is arranged. In the present case, this component is configured as an independent component. The coolant supply unit 20 can be a 3D pressure piece, for example.

The coolant supply unit 20 comprises a plurality of coolant supply passages 44, each opening obliquely in the circumferential direction as well as obliquely in the direction of the central axis inside the groove 16, in particular just below the first front face 32 of the turbine base body 22.

The mouth of the coolant supply passages 44 and the coolant inlets 36 on the turbine base body 22 are linear and/or tangentially aligned with one another. This achieves an approximately laminar inflow of the coolant into the coolant passages 30 of the turbine base body 22, resulting in a high efficiency and achievable rotation speed of the coolant turbine 18.

Of course, these configurations of the coolant supply unit 20 and the turbine base body 22 are to be understood as non-limiting. In particular, the turbine base body 22 can also be configured as a collision turbine or Pelton turbine. In this case, it can be advantageous for transferring force to the turbine base body 22 when inflowing coolant is not directed tangentially but rather at an angle to the turbine base body 22.

It can also be provided that the coolant supply unit 20 is directly integrated into the chuck 12. For example, bores in the bottom of the groove 16 can form the coolant supply passages 44 of the coolant supply unit 20.

The rotary cutting tool 10 described also has an annular coolant distribution passage 50 located between the bottom of the groove 16 and the turbine base body 22, as shown in FIGS. 9 and 10. In the present configuration, the coolant distribution passage 50 is a gap between the bottom of the groove 16 and the coolant supply unit 20. For example, through the coolant distribution passage 50, coolant can be distributed from one or two coolant supply passages 44 arranged in the chuck 12 to the plurality of coolant supply passages 44 of the coolant supply unit 20. Thus, a particularly uniform coolant discharge is achieved, and homogeneous cooling is obtained.

In the exemplary embodiment, the turbine base body 22 is arranged in the groove 16 above the coolant supply unit 20 such that its coolant passages 30 run obliquely counter to the cutting rotation direction of the rotary cutting tool 10. Thus, the inflowing coolant can transfer a force to the channel walls of the turbine base body 22 and generate the desired rotation counter to the cutting rotation direction.

In order to ensure during operation that all coolant exits exclusively via the coolant passages 30, annularly circumferential seals 46 are arranged between the chuck 12 and the coolant supply unit 20, as well as between the chuck 12 and one of the bearings 24. Of course, this is to be understood as non-limiting. Embodiments without separate sealing rings are also possible. It is also conceivable that seals 46 can be arranged directly between turbine base body 22 and chuck

12 or components fixedly connected to chuck 12. Further, the bearings 24 themselves can act as seals 46.

Figures 11, 12, 13:
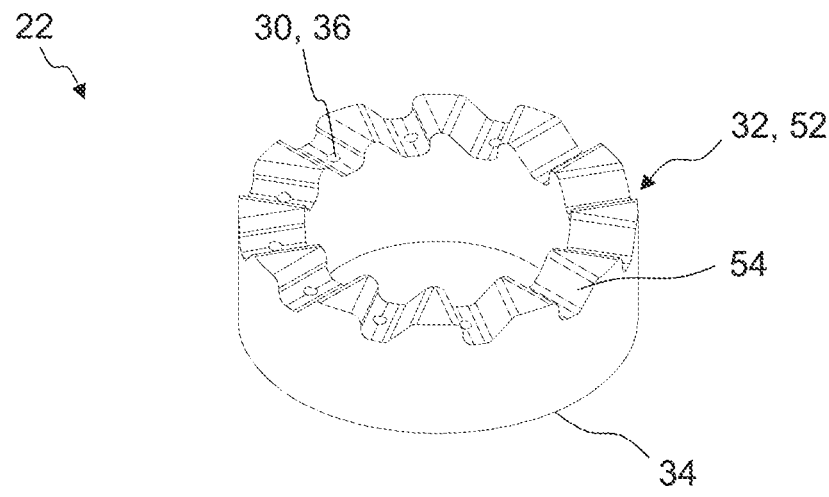
FIG. 11 shows a three-dimensional view of a turbine base body of a coolant turbine according to the invention in a second embodiment.
FIG. 12 shows a plan view of the turbine base body of FIG. 11.
FIG. 13 shows a cut view through the turbine base body along the cut plane A-A of FIG. 12.

FIGS. 11, 12, and 13 show a second embodiment of a turbine base body 22 of a coolant turbine 18 according to the present invention.

With respect to several essential features, this embodiment corresponds to the embodiment of FIGS. 3 to 7, and only the differences are discussed below. Identical and functionally equivalent elements bear the same reference numerals.

By contrast to the first embodiment, the turbine base body 22 shown has an inflow region 52 on the coolant inlet side with a plurality of inflow surfaces 54. These are each arranged at a predetermined angle, in the present case approximately 45°, to the first front face 32.

The inflow surfaces 54 are provided so that, in operation, coolant flows against them, thereby setting the turbine base body 22 in rotation.

Further, the turbine base body 22 comprises a plurality of coolant passages 30. Each of the coolant passages 30 is associated with an inflow surface 54.

In particular, the coolant inlets 36 of the coolant passages 30 and the associated inflow surfaces 54 can be arranged and aligned with one another such that inflowing coolant is directed from the inflow surfaces 54 to the coolant inlets 36.

By contrast to the first embodiment of the turbine base body 22, the coolant passages 30 run linearly. The coolant inlets 36 and corresponding coolant outlets 38 are also not circumferentially arranged offset from one another.

In the present case, the offset arrangement can be omitted, because the transfer of force achievable through the inflow surfaces 54 to the turbine base body 22 is sufficient in order to produce the desired rotational movement.

Thus, the manufacture of the turbine base body 22 is comparatively simple. For example, the inflow surfaces 54 can be produced by milling. The coolant passages 30 can be bores, in particular.

Figure 14:
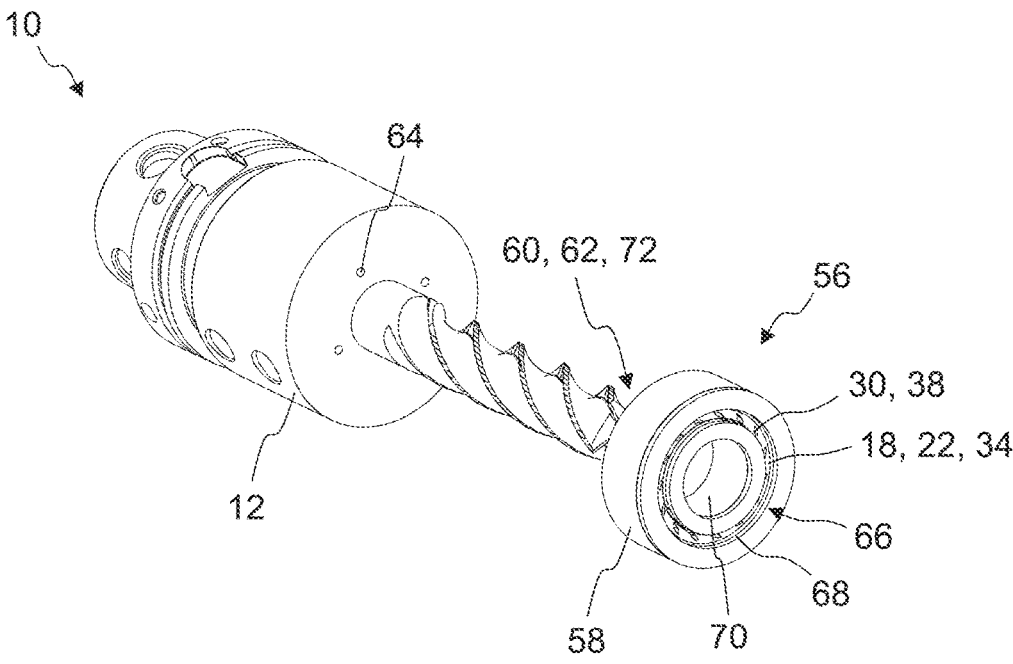
FIG. 14 shows a three-dimensional blast drawing of a conventional rotary cutting tool having a coolant turbine module.

FIG. 14 shows a three-dimensional view of a rotary cutting tool 10 known from the prior art as well as a coolant turbine module 56 according to the invention. The two elements are shown separately in the figure.

Figure 15:
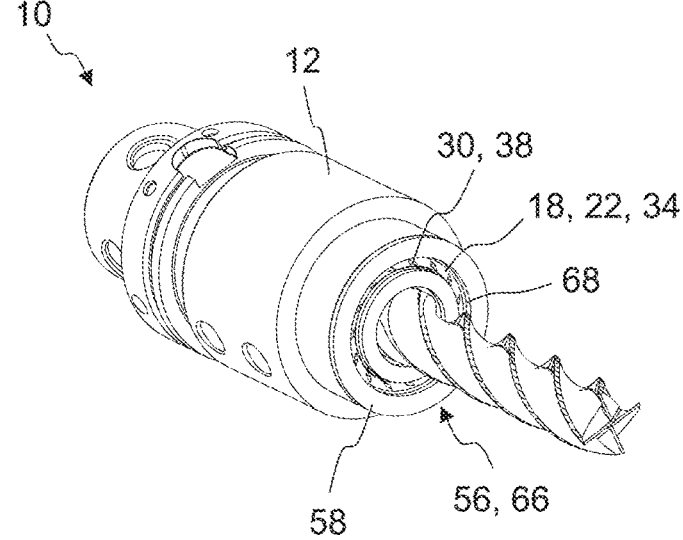
FIG. 15 shows a further three-dimensional view of the rotary cutting tool and coolant turbine module of FIG. 14 in an assembled state.

FIG. 15 shows the same rotary cutting tool 10 and coolant turbine module 56 in the assembled state.

The coolant turbine module 56 serves to easily attach a coolant turbine 18 according to the present invention to conventional rotary cutting tools 10 with chuck cooling systems, without having to make major changes to the chuck 12.

The coolant turbine module 56 comprises a hollow, cylindrical housing 58. In this housing, there is a coolant turbine 18 of the first embodiment according to the present invention.

At a first front face 60, the housing 58 has coolant inlet openings 62. In FIG. 15, the coolant turbine module 56 is attached to the rotary cutting tool 10 in such a way that coolant openings 64 present in the chuck 12 immediately abut the coolant inlet openings 62 of the housing 58. This allows coolant to leave the chuck 12 and arrive at the coolant turbine module 56 and the coolant turbine 18 arranged therein.

Further, at an opposite second front face 66, the housing 58 comprises a coolant outlet 68. Through this outlet, the coolant can be ejected towards the machining region during operation.

Between the two front faces 60, 66, there is a central cutting element opening 70 in the housing. This is large enough to fit through at least one receptacle region of a cutting element, for example a drill, to be fixed in the chuck 12. This allows for a cutting element change on the rotary cutting tool 10 without the need to remove the coolant turbine module 56.

Further, the coolant turbine module 56 includes a fastening means 72 for fastening to a rotary cutting tool. These can be, for example, bolt holes, catches, adhesive surfaces, or other means suitable for fastening. In the exemplary embodiment, the fastening means 72 is arranged on the first front face 60 of the housing 58 and is correspondingly obscured in the views shown.

The arrangement of the fastening means 72 near the chuck allows for a simple fixing of the coolant turbine module 56 to the rotary cutting tool 10, for example, by hooking, twisting, or counter-pressing.

Thus, the rotary cutting tool 10 can be easily retrofitted with the coolant turbine 18, without the need to introduce a groove 16 into the chuck 12.

The rotary cutting tools 10 shown in FIGS. 1, 2, 8, 9, 10, 14, and 15 are intended, in particular, to be operated with a method according to the invention, which is described below by way of example.

According to the invention, coolant flows into the coolant turbine 18. The coolant transfers a force to the turbine base body 22 on the basis of the geometrical design of the coolant passages 30 and/or inflow surfaces 54, which causes it to rotate counter to the rotation direction of the rotary cutting tool 10 and expel the coolant at a reduced relative speed.

In a preferred embodiment of the method, the coolant pressure and/or the coolant flow rate of the coolant introduced into the rotary cutting tool 10 is controlled as a function of the speed of the rotary cutting tool 10. For example, the controller can use stored pressure/speed diagrams and/or pressure or flow sensors.

Due to the control, the coolant is subject to a lower coolant pressure or introduced at a lower coolant flow rate at lower speeds of the rotary cutting tool 10. Conversely, at higher speeds, a higher coolant pressure or flow rate is set. The higher pressure or coolant flow rate results in a higher power transmission, which also causes the turbine base body 22 to rotate faster. This is necessary at higher cutting speeds in order to reduce the relative ambient speed acting on the coolant immediately prior to its exit. As a result, centrifugal forces acting on the coolant also decrease. Thus, the coolant is less strongly driven away from the cutting element in the circumferential direction on its way to the cutting interface.

For example, the coolant pressure or the coolant flow rate can be controlled in such a way that, when rotary cutting, the absolute rotation speed or rotational angular velocity of the turbine base body 22 compared to a static reference point, for example a workpiece to be processed, is less than 50%, or less than 25%, of the momentary rotation speed of the rotary cutting tool 10 with respect to the same reference point. Ideally, the turbine base body 22 can rotate at the same speed as the chuck 12, but in the opposite direction. Then, the absolute rotation speed or rotational angular velocity of the turbine base body 22 is zero compared to the static reference point, and no or only negligible centrifugal forces act on the coolant.

In extreme cases, the coolant pressure or coolant flow rate can be set so high that the turbine base body 22 rotates faster in the opposite rotation direction than the rotary cutting tool 10. This can, for example, selectively affect the trajectory of the exiting coolant.

LIST OF REFERENCE NUMERALS

10 Rotary cutting tool
12 Chuck

14 Tool receptacle opening
16 Groove
18 Coolant turbine
20 Coolant supply unit
22 Turbine base body
24 Bearing
26 Fixing ring
28 Retaining ring
30 Coolant passage
32 First front face
34 Second front face
36 Coolant inlet
38 Coolant outlet
40 Fastening means
42 Gliding surface
44 Coolant supply passage
46 Seal
50 Coolant distribution passage
52 Inflow region
54 Inflow surface
56 Coolant turbine module
58 Housing
60 First front face of the housing
62 Coolant inlet opening
64 Coolant opening
66 Second front face of the housing
68 Coolant outlet opening
70 Cutting element opening
72 Fastening element

The invention claimed is:

1. A rotary cutting tool, comprising a chuck having a tool receptacle opening, at least one coolant supply passage, and an axially open groove that is arranged on the front face so as to run annularly around the tool receptacle opening, wherein a turbine base body of a coolant turbine is arranged so as to be freely rotatable in the groove, wherein the coolant turbine includes an annular turbine base body having a first front face, an opposite second front face, and a plurality of coolant passages, which are arranged so as to be distributed around a central axis of the turbine base body, said passages having a coolant inlet and a coolant outlet, each of which extends through the turbine base body at least in portions in such a way that the turbine base body can be set into rotation by a flow of coolant.

2. The rotary cutting tool of claim 1, wherein the turbine base body is arranged in the groove such that the coolant passages of the turbine base body run at least partially obliquely counter to the cutting rotation direction of the rotary cutting tool.

3. The rotary cutting tool of claim 1, wherein the groove has a bottom at which the at least one coolant supply passage terminates, wherein a coolant distribution passage is formed between the bottom of the groove and the turbine base body, said passage being annular in at least some portions.

4. The rotary cutting tool of claim 1, comprising a coolant supply unit having a plurality of coolant supply passages, each opening into the groove obliquely in the circumferential direction and/or obliquely in the direction of the central axis.

5. The rotary cutting tool of claim 1, wherein a fixing ring is provided, which is arranged on the chuck and partially closes the groove and holds the turbine base body in the groove.

6. The rotary cutting tool of claim 1, wherein at least the turbine base body is releasably attached to the chuck.

7. The rotary cutting tool of claim 1, comprising a seal arranged between the turbine base body and the chuck and/or the turbine base body and a component fixedly connected to the chuck.

* * * * *